H. C. CLAY.
SPEED VARYING TRANSMISSION.
APPLICATION FILED OCT. 31, 1921.

1,434,992.

Patented Nov. 7, 1922.
2 SHEETS—SHEET 1.

Inventor
Harry C. Clay,
By Hood Sibley
Attorneys

H. C. CLAY.
SPEED VARYING TRANSMISSION.
APPLICATION FILED OCT. 31, 1921.
1,434,992.
Patented Nov. 7, 1922.
2 SHEETS—SHEET 2.
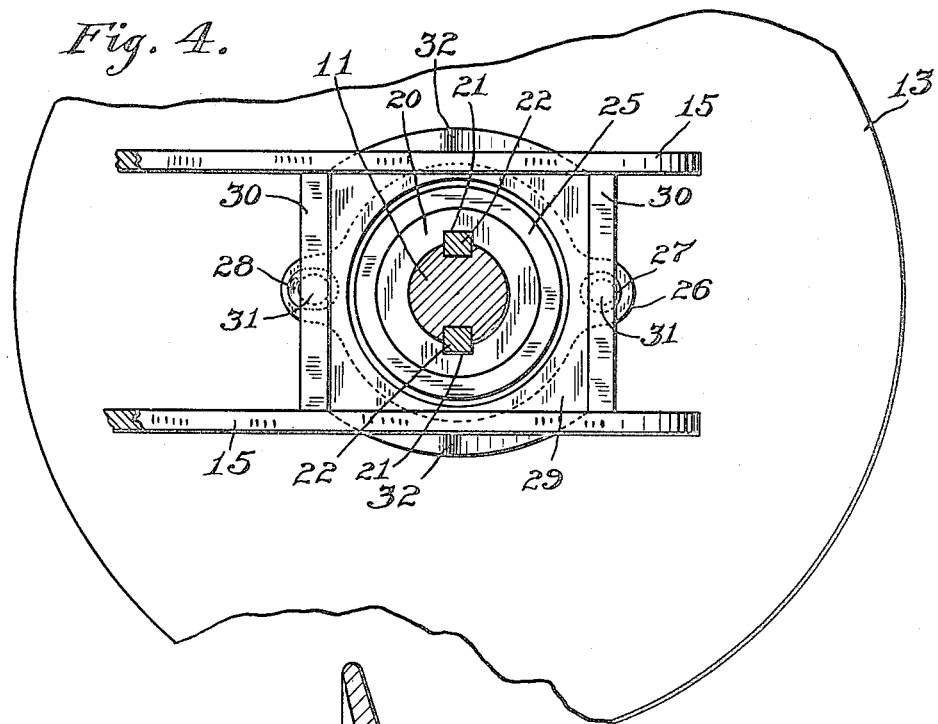
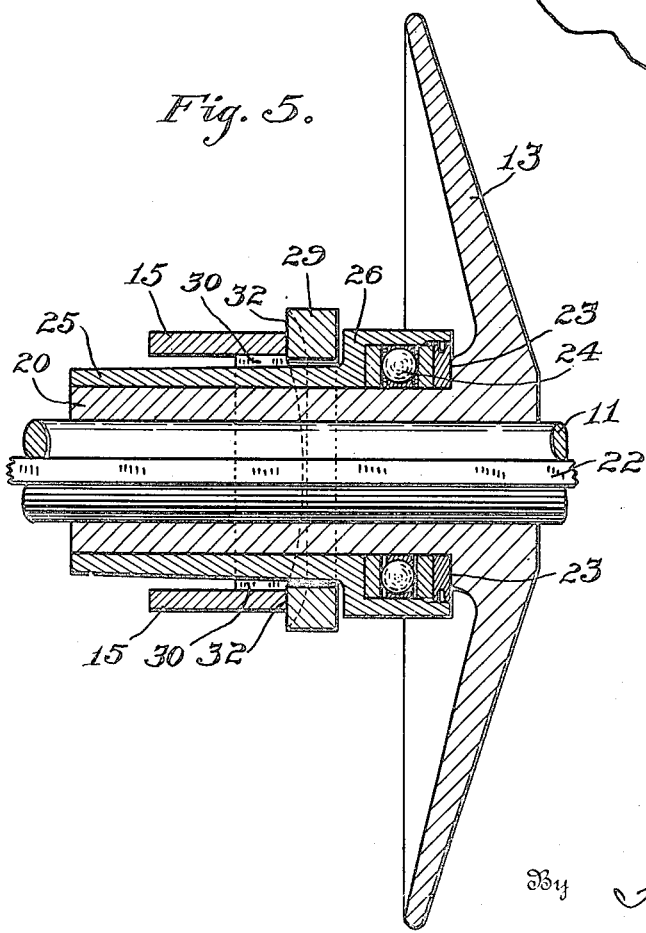
Inventor
Harry C. Clay,
By Hood & Schley
Attorneys Patented Nov. 7, 1922.

1,434,992

UNITED STATES PATENT OFFICE.

HARRY C. CLAY, OF COLUMBUS, INDIANA, ASSIGNOR TO REEVES PULLEY COMPANY, OF COLUMBUS, INDIANA, A CORPORATION OF INDIANA.

SPEED-VARYING TRANSMISSION.

Application filed October 31, 1921. Serial No. 511,631.

*To all whom it may concern:*

Be it known that I, HARRY C. CLAY, a citizen of the United States, residing at Columbus, in the county of Bartholomew and State of Indiana, have invented a new and useful Speed-Varying Transmission, of which the following is a specification.

In that type of speed varying transmission in which there are two pairs of co-acting cones supporting a V-shaped belt, the cones of the two pairs being simultaneously shifted in opposite directions in order to vary the radii of contact between the belt and cone pairs, it has heretofore been customary for many years to control the position of the cone elements of each pair by means of thrust bearings acting upon the ends of the hubs of the cones and, because an apparatus of this kind must ordinarily be as compact as possible, the hubs of the cone elements have been made comparatively short. As a consequence, owing to the heavy wedging force exerted by the belt upon the cones, considerable difficulty has been experienced in maintaining proper thrust bearings.

The object of my present invention is to provide improvements in details of construction by means of which the cone elements may be provided with materially longer bearings on the shafts, without increasing the lateral dimensions of the apparatus as a whole, and by means of which the thrust bearings may be so supported that they will more readily carry the loads to which they are subjected without detriment.

Figure 1:
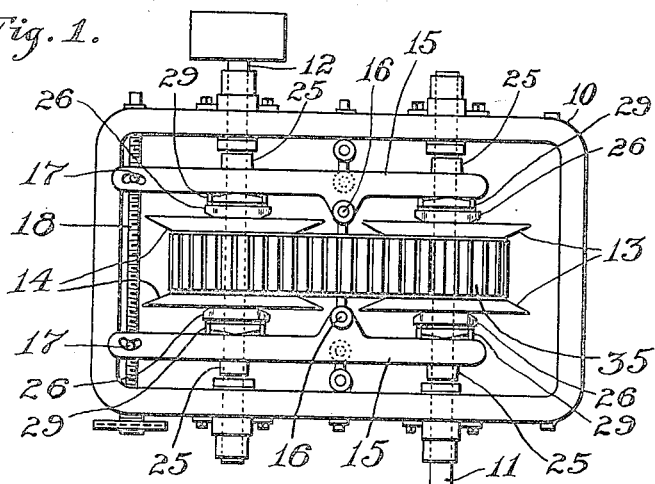
Figure 2:
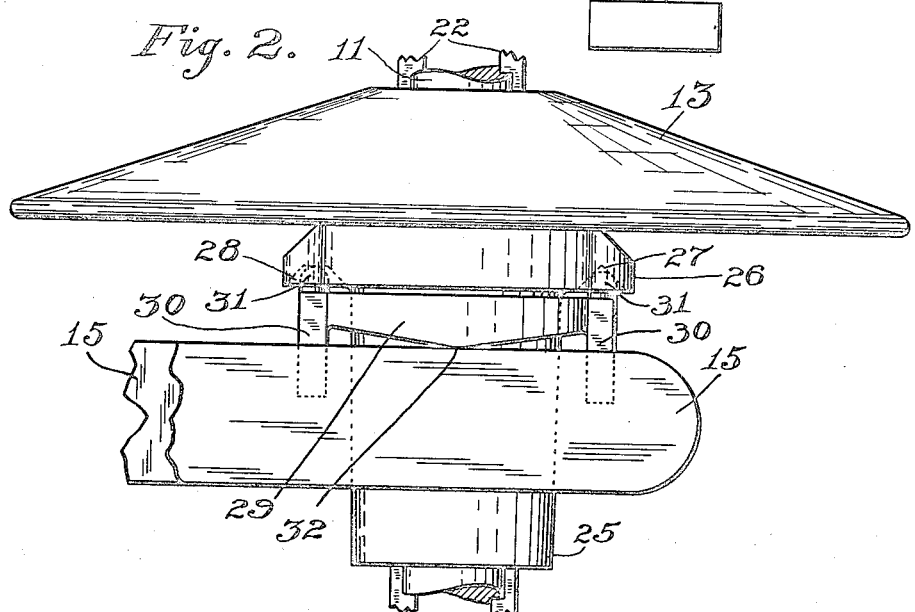
Figure 3:
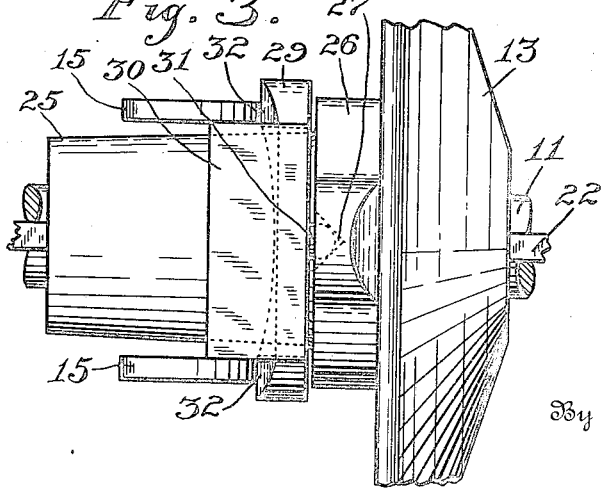

The accompanying drawings illustrate my invention. Fig. 1 is a plan of an apparatus, commercially known as the "Reeves speed varying transmission", embodying my invention; Fig. 2, a plan of one of the cone elements and adjacent parts; Fig. 3 an end elevation; Fig. 4, a side elevation with the cone shaft in section, and Fig. 5, an axial section of one of the cone elements and adjacent parts.

In the drawings, 10 indicates a suitable supporting frame in which are journaled the driving shaft 11 and the driven shaft 12, said shafts being parallel and provided with axially movable cone pairs 13, 13 and 14, 14, respectively, said cone pairs being splined upon their respective shafts and oppositely shiftable toward and from each other by means of shifting levers 15, 15, fulcrumed at 16 and simultaneously shifted in opposite directions by means of a screw 18 and nuts 17, 17 engaging the levers 15, 15.

To the above extent the apparatus is standard and well known apparatus which has been on the market for many years.

In the present construction each of the cones is provided with a relatively long hub 20 having key ways 21 through its entire length to co-act with the splines 22 of the shaft. At about the axial middle of the cone, the hub is provided externally with an annular shoulder 23 against which the inner race of a ball or roller bearing 24 abuts, this ball bearing having an axial extent very considerably less than the length of the hub of the cone.

Sleeved over the outer end of the hub of the cone, and fitting the same with an accurate running fit, is the sleeve 25 of a cup 26 within which a bearing 24 is nested and which extends entirely over said bearing so as to form a protection for the bearing. The cup 26 is of larger diameter than the sleeve 25, and in the annular surface thus formed, I provide two depressions or pockets 27 and 28, which are diametrically opposed to each other. The pocket 27 is preferably substantially conical while the pocket 28 is conical but oblated radially relative to the sleeve 25. Surrounding the sleeve 25 loosely, is a ring or yoke 29 provided at diametrically opposite sides with plates 30, 30, which extend axially of the cone 13.

At diametrically opposite points relative to the ring, and at the middles of plates 30, and extending toward the cone, are two pins or fingers 31, 31, which are either conical or semi-spherical at the proper diameter to fit in the pockets 27 and 28. It will be noted that pin 31 which seats in pocket 27 will be in contact with the walls of the pocket both radially and circumferentially relative to the axis of sleeve 25 while the pin which seats in pocket 28 will contact with the walls of said pocket only circumferentially relative to the sleeve. By this arrangement, I am able to form the pockets 27 and 28 by ordinary casting methods without the necessity of accurate machining and any slight variations in dimensions will not interfere with the proper co-relation of parts.

At diametrically opposite points on ring 29, on the surface away from the cone, and preferably ninety degrees from the line extending from the two pins 31, I provide fulcrum ridges 32 against which the inner faces of the levers 15, 15 will lie.

In practice, the levers 15, 15 are each formed by two parallel plates or bars, as clearly shown in Fig. 4, and the plates 30, 30 are so proportioned as to extend from one bar 15 to the companion bar 15, thereby holding the ring 29, and consequently the cup 26, against rotation about the axis of the adjacent cone.

The two pairs of cones are connected by a belt 35 which is V-shaped in cross section so as to co-act with the cone pairs.

By the above described arrangement, the thrusts existing between the cone belt and the levers 15 are taken by the bearing 24 and, because the flexible connections, provided by the ring 29 between the bearing 25 and the lever 15, is arranged in a plane between the cone and the end of the cone hub and the end of the cup sleeve, the load is distributed equally throughout the entire bearing 24 and consequently the crushing of individual balls of the bearing, which has heretofore been not unusual, is prevented. It is apparent also that by forming the ring 29 in the manner described, a mere contact between the lever 15 and the ring 29 produces an operative structure, thus avoiding the necessity of accurately machine connections which have heretofore been considered necessary.

It will also be noted that, if there is a direct connection between the lever and bearing cup, as in former constructions, unavoidable slight rotation of the bearing cup relative to the abutting lever, shifts the load from the two diametrically opposite trunnion pins to only one of said pins and consequently carries the entire load to only one, or a few, of the balls at one side of the bearing. By my present construction the equalizing ring insures, at all times, an equality of load throughout the bearing 24.

I claim as my invention:

1. In a speed varying transmission, the combination with belt-receiving cone pairs having extended hubs, and shafts upon which said cone pairs are splined, of a thrust sleeve journaled upon said extended hub and having an axial extent substantially co-extensive with the cone hub, and a bearing-receiving cup, within the cup of the sleeve, a controlling lever, and a yoke interposed between said lever and sleeve intermediate the length of the sleeve, said yoke having a rocking engagement with the sleeve at diametrically opposite points on a line substantially parallel with the plane of the lever, and a rocking engagement with the lever at diametrically opposite points on a line substantially at right angles to the plane of the lever.

2. In a speed varying transmission, the combination with belt-receiving cone pairs having extended hubs, and shafts upon which said cone pairs are splined, of a thrust sleeve journaled upon said extended hub and having an axial extent substantially co-extensive with the cone hub, an anti-friction thrust bearing encircling the cone hub and interposed between the cone and sleeve, a controlling lever, and a yoke interposed between said lever and sleeve intermediate the length of the sleeve, said yoke having a rocking engagement with the sleeve at diametrically opposite points on a line substantially parallel with the plane of the lever, and a rocking engagement with the lever at diametrically opposite points on a line substantially at right angles to the plane of the lever.

3. In a speed varying transmission, a transmission cone, a thrust sleeve, an interposed thrust bearing, a cooperating equalizing ring contacting with the thrust sleeve at diametrically opposite points by means of a pair of pins seating in a pair of conical pockets, one pin-and-pocket pair being relatively radially oblated, the plane of co-action between the sleeve and ring being intermediate the length of the sleeve, a controlling lever having portions lying upon diametrically opposite sides of the axis of the equalizing ring, and fulcrum surfaces affording a rocking contact between the ring and lever at diametrically opposite points on the ring and on a line substantially at right angles to the line of the pin-and-pocket contact between the ring and sleeve.

4. In a speed varying transmission, a transmission cone, a thrust sleeve, an interposed thrust bearing, a cooperating equalizing ring contacting with the thrust sleeve at diametrically opposite points by means of a pair of pins seating in a pair of conical pockets, one pin-and-pocket pair being relatively radially oblated, the plane of co-action between the sleeve and ring being intermediate the length of the sleeve.

5. In a speed varying transmission, a transmission cone, a thrust sleeve, an interposed thrust bearing, a cooperating equalizing ring contacting with the thrust sleeve at diametrically opposite points by means of a pair of pins seating in a pair of conical pockets, one pin-and-pocket pair being relatively radially oblated, a controlling lever having portions lying upon diametrically opposite sides of the axis of the equalizing ring, and fulcrum surfaces affording a rocking contact between the ring and lever at diametrically opposite points on the ring and on a line substantially at right angles to the line of the pin-and-pocket contact between the ring and sleeve.

6. In a speed varying transmission, a transmission cone, a thrust sleeve, an interposed thrust bearing, a cooperating equalizing ring contacting with the thrust sleeve by a rocking connection at diametrically opposite points, a controlling lever and a rocking contact between the controlling lever and the equalizing ring at diametrically opposite points on a line substantially at right angles to the line of rock between the equalizing ring and thrust sleeve.

7. In a speed varying transmission, a transmission cone, a thrust bearing engaging said cone, a controlling lever, and an equalizing ring interposed between said cone and bearing, said equalizing ring having rocking connections with the bearing and lever, one of said rocking connections being substantially parallel with the plane of the lever and the other substantially at right angles thereto.

8. In a speed varying transmission, a transmission cone, a thrust bearing engaging said cone, a controlling lever, and an equalizing ring interposed between said cone and bearing, said equalizing ring having rocking connections with the bearing and lever, said rocking connections lying at an angle to each other.

9. In a speed varying transmission, a transmission cone, a thrust bearing engaging said cone, a controlling lever, and an equalizing ring interposed between and co-acting with said lever and bearing in such manner as to swing relatively to both the bearing and the lever, one of the axes of such swinging being substantially parallel with the plane of the lever and the other substantially at right angles thereto.

10. In a speed varying transmission, a transmission cone, a thrust bearing engaging said cone, a controlling lever, and an equalizing ring interposed between and co-acting with said lever and bearing in such manner as to swing relatively to both the bearing and the lever, one of the axes of such swing lying at an angle to the other.

In witness whereof, I, HARRY C. CLAY, have hereunto set my hand at Columbus, Indiana, this 21st day of October, A. D. one thousand nine hundred and twenty-one.

HARRY C. CLAY.